US012586792B2

(12) United States Patent
Wang et al.

(10) Patent No.: US 12,586,792 B2
(45) Date of Patent: Mar. 24, 2026

(54) NEGATIVE ELECTRODE PLATE AND PREPARATION METHOD THEREFOR, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Xihui Wang, Ningde (CN); Wenzhu Xu, Ningde (CN); Xiaoming Ge, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 522 days.

(21) Appl. No.: 18/198,844

(22) Filed: May 18, 2023

(65) Prior Publication Data

US 2023/0343958 A1      Oct. 26, 2023

Related U.S. Application Data

(63) Continuation of application No. PCT/CN2021/131507, filed on Nov. 18, 2021.

(51) Int. Cl.
| | |
|---|---|
| *H01M 4/583* | (2010.01) |
| *H01M 4/02* | (2006.01) |
| *H01M 4/04* | (2006.01) |
| *H01M 4/38* | (2006.01) |
| *H01M 4/485* | (2010.01) |
| *H01M 10/0525* | (2010.01) |
| *H01M 10/0562* | (2010.01) |

(52) U.S. Cl.
CPC ......... *H01M 4/583* (2013.01); *H01M 4/0416* (2013.01); *H01M 4/386* (2013.01); *H01M 4/387* (2013.01); *H01M 4/485* (2013.01); *H01M 10/0525* (2013.01); *H01M 10/0562* (2013.01); *H01M 2004/021* (2013.01); *H01M 2004/027* (2013.01); *H01M 2220/20* (2013.01)

(58) Field of Classification Search
None
See application file for complete search history.

(56) References Cited

FOREIGN PATENT DOCUMENTS

| | | |
|---|---|---|
| CN | 206134845 U | 4/2017 |
| CN | 109524710 A | 3/2019 |
| CN | 107403904 B | 3/2020 |
| CN | 111095625 A | 5/2020 |
| JP | 2005-209411 A | 8/2005 |

(Continued)

OTHER PUBLICATIONS

Fukunaga et al, WO 2020059549, English Translation from WIPO (Year: 2020).*

(Continued)

*Primary Examiner* — Colin W. Slifka
(74) *Attorney, Agent, or Firm* — XSENSUS LLP

(57) ABSTRACT

A negative electrode plate may comprise a negative electrode current collector and a negative electrode film layer provided on at least one surface of the negative electrode current collector; the negative electrode film layer may comprise a first region and a second region along the width direction, the first region may not comprise a solid electrolyte, while the second region may comprise a solid electrolyte.

20 Claims, 3 Drawing Sheets

(56)     References Cited

FOREIGN PATENT DOCUMENTS

| | | | |
|---|---|---|---|
| JP | 2011-154902 | A | 8/2011 |
| JP | 2012-169071 | A | 9/2012 |
| JP | 2013-182712 | A | 9/2013 |
| JP | 2016-201231 | A | 12/2016 |
| WO | 2020/059549 | A1 | 3/2020 |

OTHER PUBLICATIONS

International Search Report mailed on Jul. 27, 2022, received for PCT Application PCT/CN2021/131507, filed on Nov. 18, 2021, 6 pages including English Translation.

* cited by examiner

5

5

NEGATIVE ELECTRODE PLATE AND PREPARATION METHOD THEREFOR, SECONDARY BATTERY, BATTERY MODULE, BATTERY PACK AND POWER CONSUMING DEVICE

CROSS-REFERENCE TO RELATED APPLICATION

The present application is a continuation of International Application No. PCT/CN2021/131507, filed Nov. 18, 2021, which is incorporated herein by reference in its entirety.

TECHNICAL FIELD

The present application relates to the technical field of lithium batteries, in particular to a negative electrode plate and to a method for preparing the negative electrode plate, a secondary battery, a battery module, a battery pack and a power consuming device.

BACKGROUND ART

In recent years, secondary batteries have been widely used in energy storage power systems such as hydroelectric, thermal, wind and solar power plants, as well as electric tools, electric bicycles, electric motorcycles, electric vehicles, military equipment, aerospace and other fields.

How to achieve good cycling performance and safety performance of secondary batteries at the same time is still an important problem to be solved urgently.

SUMMARY

One of the purposes of the present application is to provide a negative electrode plate, a method for preparing the negative electrode plate, a secondary battery comprising the negative electrode plate, a battery module, a battery pack and a power consuming device, aiming at improving the cycling performance, storage performance and safety performance of the battery at the same time.

In order to achieve the above object or other objects, in a first aspect, the present application provides a negative electrode plate comprising a negative electrode current collector and a negative electrode film layer provided on at least one surface of the negative electrode current collector; the negative electrode film layer comprises a first region and a second region along the width direction, the first region does not comprise a solid electrolyte, while the second region comprises a solid electrolyte.

The negative electrode plate of the present application can still ensure the normal de-intercalation of active ions in the presence of a small amount of electrolyte, thereby solving the problem of lithium precipitation in the negative electrode caused by the extrusion of the electrolyte and allowing the battery to have a good cycling performance, storage performance and safety performance.

In one embodiment, the first region comprises a first film layer region and a second film layer region along the width direction of the negative electrode film layer, and the second region is located between the first film layer region and the second film layer region; the width of the negative electrode film layer is denoted as L, the width of the first film layer region is denoted as $L_1$, the width of the second region is denoted as $L_2$, and the width of the second film layer region is denoted as $L_3$. In the negative electrode plate of the present application, the second region containing a solid electrolyte is provided between the first film layer region and the second film layer region, which effectively solves the problem of lithium precipitation caused by the extrusion of the electrolyte, and significantly improves the cycling performance, storage performance and safety performance of the battery.

In one embodiment, $0<L_1/L\leq0.75$; optionally, $0.3\leq L_1/L\leq0.55$.

In one embodiment, $0<L_3/L\leq0.75$; optionally, $0.25\leq L_3/L\leq0.75$.

Such arrangement can ensure that the second region containing the solid electrolyte is located in the middle of the negative electrode film layer, which solves the problem of lithium precipitation caused by the extrusion of the electrolyte caused by the expansion in the middle of the electrode plate, thereby improving the cycling performance, storage performance and safety performance of the battery at the same time.

In one embodiment, $0<L_2/L\leq0.75$; optionally, $0.3\leq L_2/L\leq0.55$. The use of the second region containing the solid electrolyte in this width range can keep the normal de-intercalation of active ions in the case of the extrusion of the electrolyte, and reduce the lithium precipitation of the negative electrode, thereby allowing the negative electrode plate of the present application to have a good cycling performance, storage performance and safety performance while maintaining a higher energy density.

In one embodiment, the mass percentage of the solid electrolyte in the second region is greater than 0 and not greater than 30%, optionally 15%-30%. When the mass percentage of the solid electrolyte in the second region is too large, it is easy to cause the loss of the energy density of the electrode plate, and by limiting the mass percentage to be greater than 0 and not greater than 30%, the second region containing the solid electrolyte can not only ensure the normal de-intercalation of active ions in the case of the extrusion of the electrolyte, thereby solving the problem of lithium precipitation in the negative electrode caused by the large expansion force in the middle of the negative electrode, but also reduce the loss of the energy density of the electrode, thereby ensuring the electrode plate to have a sufficient energy density.

In one embodiment, $L_1=L_3$, which facilitates the processing of the negative electrode plate and improves the production efficiency of the negative electrode plate, meanwhile, the second region is located in the middle of the negative electrode film layer along the width direction, which can better solve the problem of lithium precipitation in the negative electrode caused by the large expansion force in the middle of the electrode plate.

In one embodiment, $L_1=L_2=L_3$, which further facilitates the processing of the electrode plate and improves the production efficiency.

In one embodiment, the solid electrolyte is selected from at least one of oxide solid electrolyte, sulfide solid electrolyte and polymer solid electrolyte. All of these solid electrolyte can be used in the second region to improve the cycling performance, storage performance and safety performance of the battery at the same time.

In one embodiment, the first region and the second region both comprise a negative electrode active material. The negative electrode active material of the first region and the second region can be a negative electrode active material known in the art for batteries. Optionally, the negative electrode active material in the first region and the second region are each independently selected from at least one of artificial graphite, natural graphite, soft carbon, hard carbon, a silicon-based material, a tin-based material and lithium titanate. The silicon-based material can be selected from at least one of elemental silicon, a silicon oxide compound, a silicon-carbon composite, a silicon-nitrogen composite, and a silicon alloy. The tin-based material can be selected from at least one of elemental tin, a tin oxide compound, and a tin alloy. However, the present application is not limited to these materials, and other conventional materials that can be used as negative electrode active materials for batteries can also be used. These negative electrode active materials may be used alone or in combination of two or more. For example, the negative electrode active material of the first region and the second region is independently graphite and/or a silicon-based material.

In one embodiment, the first region has a porosity of ≥24%; optionally, 24%-28%.

In one embodiment, the second region has a porosity of ≥20%; optionally, 20%-24%.

The first region does not comprise a solid electrolyte, and a larger porosity on the electrode plate is beneficial to the transmission of lithium ions; and the second region comprise a solid electrolyte, a smaller porosity is beneficial to improve the contact between the solid electrolyte and the active material and ensure the transmission of lithium ions; The present application is directed to a system using an electrolyte as a lithium ion transmission conductor, the above porosity not only ensures that the active ions have sufficient diffusion channels in the negative electrode plate, but also meets the requirement that the electrode plate does not precipitate lithium, and at the same time enables the electrode plate to be fully infiltrated to ensure the kinetics of the anode material, thereby ensuring the battery to have a good cycling performance, storage performance and safety performance.

In a second aspect, the present application provides a method for preparing a negative electrode plate of the first aspect of the present application, comprising the steps of:

dividing at least one surface of the negative electrode current collector into a first section and a second section along the width direction;

providing a first negative electrode slurry and a second negative electrode slurry, wherein the first negative electrode slurry does not comprise a solid electrolyte, while the second negative electrode slurry comprises a solid electrolyte; and coating the first section with the first negative electrode slurry, and coating the second section with the second negative electrode slurry.

The prepared negative electrode plate can still ensure the normal de-intercalation of active ions in the presence of a small amount of electrolyte, thereby alleviating the problem of lithium precipitation in the negative electrode caused by the extrusion of the electrolyte and allowing the battery to have a good cycling performance, storage performance and safety performance.

In one embodiment, the first section is divided into a first portion and a second portion along the width direction of the negative electrode current collector, and the second section is located between the first portion and the second portion. In this way, the second section between the first portion and the second portion is coated with a second negative electrode slurry containing a solid electrolyte to prepare a negative electrode plate, which effectively alleviates the problem of lithium precipitation caused by the extrusion of the electrolyte in the middle of the electrode plate, and significantly improves the cycling performance, storage performance and safety performance of the battery.

In one embodiment, the ratio of the width of the first portion to the negative electrode current collector is greater than 0 and not greater than 0.75, optionally 0.3-0.55.

In one embodiment, the ratio of the width of the second portion to the negative electrode current collector is greater than 0 and not greater than 0.75, optionally 0.25-0.75.

This ensures that the second section to be coated with the second negative electrode slurry is located in the middle of the electrode plate, which solves the problem of lithium precipitation caused by the extrusion of the electrolyte in the middle of the electrode plate, thereby improving the cycling performance, storage performance and safety performance of the battery.

In one embodiment, the ratio of the width of the second section to the negative electrode current collector is greater than 0 and not greater than 0.75, optionally 0.3-0.55. The use of the second section to be coated with the second negative electrode slurry containing the solid electrolyte in this width range can keep the normal de-intercalation of active ions in the case of the extrusion of the electrolyte, and reduce the lithium precipitation of the negative electrode, thereby allowing the negative electrode plate of the present application to have a good cycling performance, storage performance and safety performance while maintaining a higher energy density.

In one embodiment, the width of the first portion is equal to that of the second portion. Such arrangement facilitates the preparation and processing of the negative electrode plate, improves the production efficiency of the negative electrode plate, meanwhile, such arrangement can ensure that the second section is located in the middle of the negative electrode plate, which can better solve the problem of lithium precipitation in the negative electrode caused by the large expansion force in the middle of the negative electrode plate.

In one embodiment, the mass content of the solid electrolyte in the second negative electrode slurry is greater than 0 and not greater than 30%, optionally 15%-30%. When the mass percentage of the solid electrolyte in the second negative electrode slurry is too large, it is easy to cause the loss of the energy density of the negative electrode plate, and by limiting the mass percentage to be greater than 0 and not greater than 30%, it can not only ensure that the negative electrode plate of the present application can maintain the normal de-intercalation of lithium ions in the case of extrusion of the electrolyte, thereby solving the problem of lithium precipitation in the negative electrode, but also reduce the loss of the energy density of the electrode, thereby ensuring the electrode plate to have a sufficient energy density.

In one embodiment, the negative electrode plate of the first aspect of the present application is prepared by the method of the second aspect of the present application. Herein, the position of the first section on the negative electrode current collector corresponds to the position of the first region on the negative electrode film layer, and the position of the second section on the negative electrode current collector corresponds to the position of the second region on the negative electrode film layer.

In a third aspect, the present application provides a secondary battery, comprising a negative electrode plate of the first aspect of the present application or a negative electrode plate prepared by the method of the second aspect of the present application.

In a fourth aspect, the present application provides a battery module, comprising a secondary battery of the third aspect of the present application.

In a fifth aspect, the present application provides a battery pack, comprising a battery module of the fourth aspect of the present application.

In a sixth aspect, the present application provides a power consuming device, comprising at least one selected from a secondary battery of the third aspect of the present application, a battery module of the fourth aspect of the present application, or a battery pack of the fifth aspect of the present application.

Some embodiments of the present application have achieved the following beneficial effects:

the negative electrode plate of the present application can still ensure the normal de-intercalation of active ions in the presence of a small amount of electrolyte, thereby solving the problem of lithium precipitation in the negative electrode caused by the extrusion of the electrolyte; the negative electrode plate of the present application also improves the cycling performance, storage performance and safety performance of the battery; and the negative electrode plate of the present application has a higher energy density.

LIST OF REFERENCE NUMERALS

Figure 1:
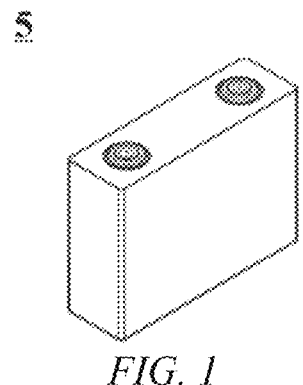
FIG. 1 is a schematic diagram of a secondary battery according to an embodiment of the present application.

1 battery pack; 2 upper casing body; 3 lower casing body; 4 battery module; 5 secondary battery; 51 housing; 52 electrode assembly; 53 cover plate.

DETAILED DESCRIPTION OF EMBODIMENTS

Hereafter, embodiments of a negative electrode plate and a preparation method therefor, a secondary battery, a battery module, a battery pack and a power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed herein are defined in the form of lower and upper limits, where a given range is defined by the selection of a lower limit and an upper limit, and the selected lower and upper limits define the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of $\geq 2$, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

[Secondary Battery]

A secondary battery, also known as a rechargeable battery or an accumulator, refers to a battery of which active materials can be activated by means of charging for reuse of the battery after the battery is discharged.

Generally, the secondary battery comprises a positive electrode plate, a negative electrode plate, a separator and an electrolyte. During a charge/discharge process of the battery, active ions (e.g., lithium ions) are intercalated and de-intercalated back and forth between the positive electrode plate and the negative electrode plate. The separator is provided between the positive electrode plate and the negative electrode plate, and mainly prevents the positive and negative electrodes from short-circuiting and enables active ions to pass through. The electrolyte is provided between the positive electrode plate and the negative electrode plate and mainly functions for active ion conduction.

[Negative Electrode Plate]

The negative electrode plate generally comprises a negative electrode current collector and a negative electrode film layer provided on at least one surface of the negative electrode current collector, wherein the negative electrode film layer comprises a negative electrode active material.

As an example, the negative electrode current collector has two surfaces opposite in its own thickness direction, and the negative electrode film layer is provided on either or both of the two opposite surfaces of the negative electrode current collector.

During the charging and discharging process of the battery, the negative electrode plate will expand and shrink, resulting in uneven stress distribution inside the battery. In particular, the negative electrode plate expands during the charging process, resulting in the extrusion of the electrolyte, and the negative electrode plate shrinks during the discharging process, but the electrolyte can not be replenished in time, resulting in the effect of "electrolyte extrusion", which affects the normal de-intercalation of active ions and leads to the lithium precipitation in the negative electrode, thereby affecting the cycling performance and safety performance of the battery.

Based on the above problems, an embodiment of the present application provides a negative electrode plate, comprising a negative electrode current collector and a negative electrode film layer provided on at least one surface of the negative electrode current collector; the negative electrode film layer comprises a first region and a second region along the width direction, the first region does not comprise a solid electrolyte, while the second region comprises a solid electrolyte.

Currently, in the related art, the effect of "electrolyte extrusion" is mainly improved by reducing the expansion force of the electrode plate to solve the problem of lithium precipitation in the negative electrode, but the improvement effect of such method is limited. In addition, with the increase in the market demand for energy density of the battery cell, a silicon material is used as the mainstream negative electrode active material, but silicon material is more prone to expansion, and it is difficult to solve the problem of lithium precipitation by reducing the expansion force. The negative electrode plate of the present application contains a solid electrolyte in the second region, even if in the case of the extrusion of the electrolyte, the normal de-intercalation of active ions can still be ensured in the presence of a small amount of electrolyte, which fundamentally solves the problem of lithium precipitation in the negative electrode caused by the extrusion of the electrolyte and slows down the attenuation rate of the battery capacity, thereby allowing the battery to have a good cycling performance, storage performance and safety performance at the same time.

In some embodiments, the first region comprises a first film layer region and a second film layer region along the width direction of the negative electrode film layer, and the second region is located between the first film layer region and the second film layer region; the width of the negative electrode film layer is denoted as L, the width of the first film layer region is denoted as $L_1$, the width of the second region is denoted as $L_2$, and the width of the second film layer region is denoted as $L_3$. In the negative electrode plate of the present application, the second region containing a solid electrolyte is provided between the first film layer region and the second film layer region, which effectively alleviates the problem of lithium precipitation caused by the extrusion of the electrolyte caused by the expansion in the middle of the electrode plate, and significantly improves the cycling performance, storage performance and safety performance of the battery.

In some embodiments, $0 < L_1/L \leq 0.75$; optionally, $0.3 \leq L_1/L \leq 0.55$, for example 0.1, 0.125, 0.2, 0.3, 0.375, 0.4, 0.45, 0.5, 0.55, and 0.6.

In some embodiments, $0 < L_3/L \leq 0.75$; optionally, $0.25 \leq L_3/L \leq 0.75$, for example 0.1, 0.125, 0.2, 0.3, 0.375, 0.4, 0.45, 0.5, 0.55, 0.6, and 0.7.

This can ensure that the second region containing the solid electrolyte is located in the middle of the negative electrode film layer, which solves the problem of lithium precipitation caused by the extrusion of the electrolyte caused by the expansion in the middle of the electrode plate, thereby improving the cycling performance, storage performance and safety performance of the battery at the same time.

In some embodiments, $0 < L_2/L \leq 0.75$; optionally, $0.3 \leq L_2/L \leq 0.55$, for example 0.1, 0.15, 0.2, 0.25, 0.3, 0.4, 0.5, 0.6, 0.7, and 0.75. The use of the second region containing the solid electrolyte in this width range can keep the normal de-intercalation of active ions in the case of the extrusion of the electrolyte, and reduce the lithium precipitation of the negative electrode, thereby allowing the negative electrode plate of the present application to have a good cycling performance, storage performance and safety performance while maintaining a higher energy density.

In some embodiments, the mass percentage of the solid electrolyte in the second region is greater than 0 and not greater than 30%, optionally 15%-30%, for example, 2%, 5%, 8%, 10%, 15%, 20%, and 25%. When the mass percentage of the solid electrolyte in the second region is too large, it is easy to cause the loss of the energy density of the electrode plate, and by limiting the mass percentage to be greater than 0 and not greater than 30%, the second region containing the solid electrolyte can not only ensure the normal de-intercalation of active ions in the case of the extrusion of the electrolyte, thereby solving the problem of lithium precipitation in the negative electrode caused by the large expansion force in the middle of the negative electrode, but also reduce the loss of the energy density of the electrode, thereby ensuring the electrode plate to have a sufficient energy density.

In some embodiments, $L_1 = L_3$. Such arrangement facilitates the processing of the negative electrode plate and improves the production efficiency of the negative electrode plate, meanwhile, the second region is located in the middle of the negative electrode film layer along the width direction, which can better solve the problem of lithium precipitation in the negative electrode caused by the large expansion force in the middle of the negative electrode plate.

In some embodiments, $L_1 = L_2 = L_3$, which further facilitates the processing of the electrode plate and improves the production efficiency.

In some embodiments, the thickness of the first region is equal to that of the second region. Such arrangement can ensure the uniformity of the thickness of the negative electrode film layer, which is beneficial to the normal use of the negative electrode plate and facilitates the processing and manufacture of the negative electrode plate.

In some embodiments, the thicknesses of the first region and the second region are conventional thicknesses of negative electrode film layers in the art, for example, the first region and the second region have thicknesses of 100-250

µm. This can not only ensure the normal use of the negative electrode plate, but also ensure the normal de-intercalation of active ions through the second region containing the solid electrolyte, and solve the problem of lithium precipitation in the negative electrode caused by the excessive expansion force in the middle of the negative electrode.

In some embodiments, the solid electrolyte is selected from at least one of oxide solid electrolyte, sulfide solid electrolyte and polymer solid electrolyte. As an example, the oxide solid electrolyte may include at least one of: LLZTO solid electrolyte, perovskite type $Li_{3.3}La_{0.56}TiO_3$, sodium fast ion conductor type $LiTi_2(PO_4)_3$, lithium fast ion conductor type $Li_{14}Zn(GeO_4)_4$, and garnet type $Li_7La_3Zr_2O_{12}$; the sulfide solid electrolyte may include at least one of: $Li_3PS_4$, $Li_6PS_5Cl$, $Li_{10}GeP_2S_{12}$, and $Li_7P_3S_{11}$; and the polymer solid electrolyte may include at least one of: polyoxyethylene (PEO), polyvinylidene fluoride (PVDF), polyacrylonitrile (PAN), polymethyl methacrylate (PMMA), polyvinylpyrrolidone (PVP) or polyvinylidene fluoride-hexafluoropropylen (PVDF-HFP). However, the present application is not limited to these materials, and other conventional materials that can be used as solid electrolytes can also be used. These solid electrolytes may be used alone or in combination of two or more.

In some embodiments, the mass percentage of the negative electrode active material in the first region can be the mass percentage of the negative electrode active material in the negative electrode film layer known in the art.

In some embodiments, the mass percentage of the negative electrode active material in the second region is 60%-95%, for example 65%, 68%, 70.5%, 75.5%, 80.5%, 85.5%, 90.5%, or 92%.

In some embodiments, the first region and the second region both comprise a negative electrode active material. The negative electrode active material of the first region and the second region can be a negative electrode active material known in the art for batteries. Optionally, the negative electrode active material in the first region and the second region are each independently selected from at least one of artificial graphite, natural graphite, soft carbon, hard carbon, a silicon-based material, a tin-based material and lithium titanate. The silicon-based material can be selected from at least one of elemental silicon, a silicon oxide compound, a silicon-carbon composite, a silicon-nitrogen composite, and a silicon alloy. The tin-based material can be selected from at least one of elemental tin, a tin oxide compound, and a tin alloy. However, the present application is not limited to these materials, and other conventional materials that can be used as negative electrode active materials for batteries can also be used. These negative electrode active materials may be used alone or in combination of two or more.

In some embodiments, the mass percentage of the silicon-based material in the second region is 1%-8%, for example, 1.2%, 2.3%, 3.5%, 4.5%, and 5.5%. In this way, in addition to the solid electrolyte, the second region further contains a silicon-based material with a higher energy density, so as to maintain the negative electrode plate with a higher energy density.

In some embodiments, the first region has a porosity ≥24%; optionally, 24%-28%.

In some embodiments, the second region has a porosity ≥20%; optionally, 20%-24%.

The first region does not comprise a solid electrolyte, and a larger porosity on the electrode plate is beneficial to the transmission of lithium ions; and the second region comprise a solid electrolyte, a smaller porosity is beneficial to improve the contact between the solid electrolyte and the active material and ensure the transmission of lithium ions; The present application is directed to a system using an electrolyte as a lithium ion transmission conductor, the above porosity not only ensures that the active ions have sufficient diffusion channels in the negative electrode plate, but also meets the requirement that the electrode plate does not precipitate lithium, and at the same time enables the electrode plate to be fully infiltrated to ensure the kinetics of the anode material, thereby ensuring the battery to have a good cycling performance, storage performance and safety performance.

In some embodiments, the negative electrode current collector may be a metal foil or a composite current collector. For example, as a metal foil, a copper foil can be used. The composite current collector may comprise a polymer material substrate and a metal layer formed on at least one surface of the polymer material substrate. The composite current collector can be formed by forming metal materials (copper, copper alloys, nickel, nickel alloys, titanium, titanium alloys, silver and silver alloys, etc.) on the polymer material base layer (such as polypropylene (PP), polyethylene terephthalate (PET), polybutylene terephthalate (PBT), polystyrene (PS), polyethylene (PE), etc.).

In some embodiments, the first region and the second region also optionally comprise a binder. The binder may be selected from at least one of a styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the mass percentage of the binder in the first region and the second region can be the mass percentage of the binder in the negative electrode film layer commonly used in the art.

In some embodiments, the first region and the second region also optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the mass percentage of the conductive agent in the first region and the second region can be the mass percentage of the conductive agent in the negative electrode film layer commonly used in the art.

In some embodiments, the first region and the second region also optionally comprise other auxiliary agents, such as thickener (e.g. sodium carboxymethyl cellulose (CMC-Na)) and the like.

Preparation Method of Negative Electrode Plate

In some embodiments, the present application further provides a method for preparing a negative electrode plate, comprising the steps of:

dividing at least one surface of the negative electrode current collector into a first section and a second section along the width direction;

providing a first negative electrode slurry and a second negative electrode slurry, wherein the first negative electrode slurry does not comprise a solid electrolyte, while the second negative electrode slurry comprises a solid electrolyte; and coating the first section with the first negative electrode slurry, and coating the second section with the second negative electrode slurry.

Therefore, the prepared negative electrode plate can still ensure the normal de-intercalation of active ions in the presence of a small amount of electrolyte, thereby alleviating the problem of lithium precipitation in the negative electrode caused by the extrusion of the electrolyte and allowing the battery to have a good cycling performance, storage performance and safety performance.

In some embodiments, the first section is divided into a first portion and a second portion along the width direction of the negative electrode current collector, and the second section is located between the first portion and the second portion. In this way, the second section between the first portion and the second portion is coated with a second negative electrode slurry containing a solid electrolyte to prepare a negative electrode plate, which effectively alleviates the problem of lithium precipitation caused by the extrusion of the electrolyte in the middle of the electrode plate, and significantly improves the cycling performance, storage performance and safety performance of the battery.

In some embodiments, the ratio of the width of the first portion to the negative electrode current collector is greater than 0 and not greater than 0.75, optionally 0.3-0.55, for example, 0.1, 0.125, 0.2, 0.3, 0.375, 0.4, 0.45, 0.5, 0.55, and 0.6.

In some embodiments, the ratio of the width of the second portion to the negative electrode current collector is greater than 0 and not greater than 0.75, optionally 0.25-0.75, for example, 0.1, 0.125, 0.2, 0.3, 0.375, 0.4, 0.45, 0.5, 0.55, 0.6, and 0.7.

This ensures that the second section to be coated with the second negative electrode slurry is located in the middle of the electrode plate, which solves the problem of lithium precipitation caused by the expansion in the middle of the electrode plate, thereby improving the cycling performance, storage performance and safety performance of the battery.

In some embodiments, the ratio of the width of the second section to the negative electrode current collector is greater than 0 and not greater than 0.75, optionally 0.3-0.55, for example, 0.1, 0.15, 0.2, 0.25, 0.3, 0.4, 0.5, 0.6, 0.7, and 0.75. The use of the second section to be coated with the second negative electrode slurry containing the solid electrolyte in this width range can keep the normal de-intercalation of active ions in the case of the extrusion of the electrolyte, and reduce the lithium precipitation of the negative electrode, thereby allowing the negative electrode plate of the present application to have a good cycling performance, storage performance and safety performance while maintaining a higher energy density.

In some embodiments, the width of the first portion is equal to that of the second portion. Such arrangement facilitates the preparation and processing of the negative electrode plate, improves the production efficiency of the negative electrode plate, meanwhile, such arrangement can ensure that the second section is located in the middle of the negative electrode plate, which can better solve the problem of lithium precipitation in the negative electrode caused by the large expansion force in the middle of the negative electrode plate.

In some embodiments, the mass content of the solid electrolyte in the second negative electrode slurry is greater than 0 and not greater than 30%, optionally 15%-30%, for example, 2%, 5%, 8%, 10%, 15%, 20% or 25%. When the mass percentage of the solid electrolyte in the second negative electrode slurry is too large, it is easy to cause the loss of the energy density of the negative electrode plate, and by limiting the mass percentage to be greater than 0 and not greater than 30%, it can not only ensure that the negative electrode plate of the present application can maintain the normal de-intercalation of lithium ions in the case of the extrusion of the electrolyte, thereby solving the problem of lithium precipitation in the negative electrode, but also reduce the loss of the energy density of the electrode, thereby ensuring the electrode plate to have a sufficient energy density.

In some embodiments, the above negative electrode plate is prepared by the present method. Herein, the position of the first section on the negative electrode current collector corresponds to the position of the first region on the negative electrode film layer, and the position of the second section on the negative electrode current collector corresponds to the position of the second region on the negative electrode film layer.

In some embodiments, the first negative electrode slurry has a coating surface density of 5-20 mg/m$^2$ on the first section, for example 12 mg/m$^2$.

In some embodiments, the second negative electrode slurry has a coating surface density of 8-25 mg/m$^2$ on the second section, for example 16 mg/m$^2$.

Therefore, the uniformity and consistency of the overall thickness of the negative electrode film layer can be ensured, which is beneficial to the normal use of the negative electrode plate and the preparation of the negative electrode plate.

In some embodiments, the first negative electrode slurry is formed by dispersing the negative electrode active material, optional conductive agent, optional binder, and any other components into a solvent.

In some embodiments, the second negative electrode slurry is formed by dispersing the solid electrolyte, the negative electrode active material, optional conductive agent, optional binder, and any other components into a solvent.

In some embodiments, the negative electrode active material of the first negative electrode slurry and the second negative electrode slurry can be a negative electrode active material known in the art for batteries. Optionally, the negative electrode active material in the first region and the second region are each independently selected from at least one of artificial graphite, natural graphite, soft carbon, hard carbon, a silicon-based material, a tin-based material and lithium titanate. The silicon-based material can be selected from at least one of elemental silicon, a silicon oxide compound, a silicon-carbon composite, a silicon-nitrogen composite, and a silicon alloy. The tin-based material can be selected from at least one of elemental tin, a tin oxide compound, and a tin alloy. However, the present application is not limited to these materials, and other conventional materials that can be used as negative electrode active materials for batteries can also be used. These negative electrode active materials may be used alone or in combination of two or more.

In some embodiments, the mass percentage of the silicon-based material in the second negative electrode slurry is 1%-8%, for example, 1.2%, 2.3%, 3.5%, 4.5%, or 5.5%. In this way, a higher energy density can be maintained in the negative electrode plate.

In some embodiments, the first negative electrode slurry and the second negative electrode slurry has a solid content suitable for normal coating to prepare a electrode plate.

[Positive Electrode Plate]

The positive electrode plate generally comprises a positive electrode current collector and a positive electrode film layer provided on at least one surface of the positive electrode current collector, the positive electrode film layer comprising the positive electrode active material of the first aspect of the present application.

As examples, the positive electrode current collector has two surfaces opposite in its own thickness direction, and the positive electrode film layer is provided on either or both of the two opposite surfaces of the positive electrode current collector.

In some embodiments, the positive electrode current collector may be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, aluminum alloys, nickel, nickel alloys, titanium, titanium alloys, silver and silver alloys, etc.) on a polymer material base layer (such as polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may include at least one of the following materials: lithium-containing phosphates of olivine structure, lithium transition metal oxides and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode film layer also optionally comprises a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer also optionally comprises a conductive agent. As an example, the conductive agent may include at least one of superconducting carbon, acetylene black, carbon black, ketjenblack, carbon dots, carbon nanotubes, graphene, and carbon nanofibers.

In some embodiments, the positive electrode plate can be prepared as follows: the above-mentioned components for preparing the positive electrode plate, such as positive electrode active material, conductive agent, binder and any other components, are dispersed in a solvent (e.g. N-methylpyrrolidone) to form a positive electrode slurry; and the positive electrode slurry is coated onto a positive electrode current collector, and is then subjected to procedures such as drying and cold pressing, so as to obtain the positive electrode plate.

[Electrolyte]

The electrolyte is located between the positive electrode plate and the negative electrode plate and functions for ionic conduction. The type of the electrolyte is not specifically limited in the present application, and can be selected according to actual requirements. For example, the electrolyte may be liquid, gel or all solid.

In some embodiments, the electrolyte is liquid and comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution also optionally comprises an additive. As an example, the additive can include a negative electrode film-forming additive, a positive electrode film-forming additive, and also an additive that can improve certain performances of the battery, such as an additive that improve the overcharge performance of the battery, or an additive that improve the high temperature performance or low-temperature performance of the battery.

[Separator]

In some embodiments, the secondary battery further comprises a separator. The type of the separator is not particularly limited in the present application, and any well known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a laminating process.

In some embodiments, the secondary battery may comprise an outer package. The outer package can be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may include polypropylene, polybutylene terephthalate, and polybutylene succinate, etc.

The shape of the secondary battery is not particularly limited in the present application, and may be cylindrical, square or of any other shape. For example, FIG. 1 shows a secondary battery 5 with a square structure as an example.

Figure 2:
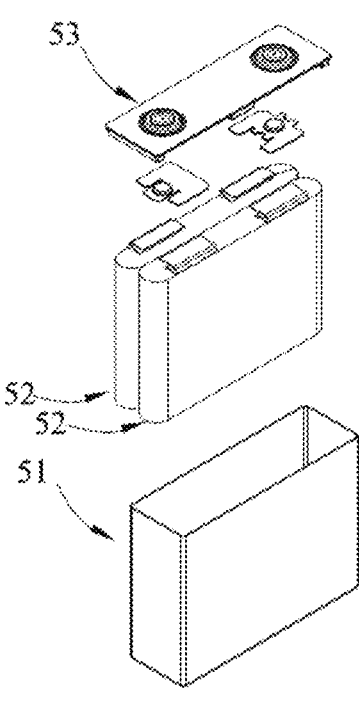
FIG. 2 is an exploded view of a secondary battery according to an embodiment of the present application as shown in FIG. 1.

In some embodiments, referring to FIG. 2, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is packaged in the accommodating cavity. An electrolyte solution is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module can be one or more, and the specific number can be selected by those skilled in the art according to the application and capacity of the battery module.

Figure 3:
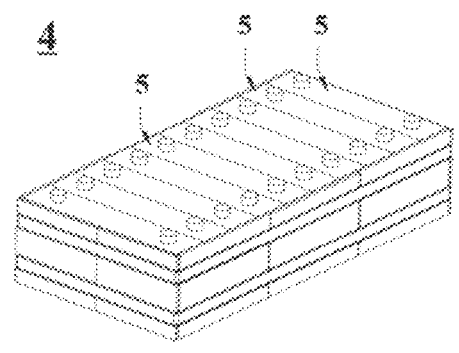
FIG. 3 is a schematic diagram of a battery module according to an embodiment of the present application.

FIG. 3 shows a battery module 4 as an example. Referring to FIG. 3, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above-mentioned battery module may also be assembled into a battery pack, the number of battery modules included in the battery pack may be one or more, and the specific number can be selected by those skilled in the art according to the application and capacity of the battery pack.

Figure 4:
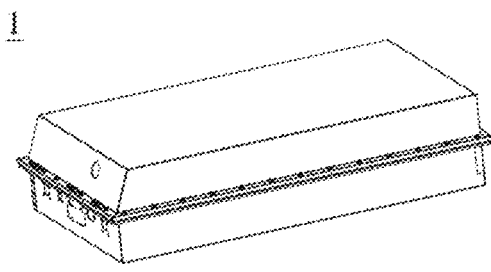
FIG. 4 is a schematic diagram of a battery pack according to an embodiment of the present application.
Figure 5:
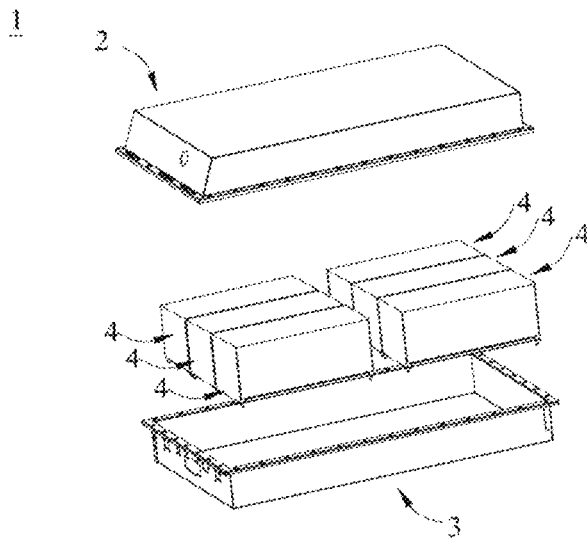
FIG. 5 is an exploded view of a battery pack according to an embodiment of the present application as shown in FIG. 4.

FIG. 4 and FIG. 5 show a battery pack 1 as an example. Referring to FIG. 4 and FIG. 5, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

In addition, the present application further provides a power consuming device. The power consuming device comprises at least one of the secondary battery, battery module, or battery pack provided by the present application. The secondary battery, the battery module or the battery pack may be used as a power source or an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As a power consuming device, the secondary battery, battery module or battery pack can be selected according to the usage requirements thereof.

Figure 6:
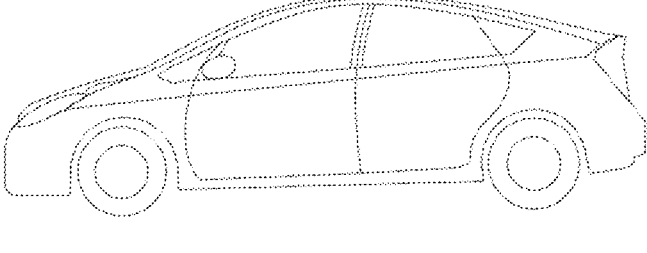
FIG. 6 is a schematic diagram of a power consuming device according to an embodiment of the present application in which a secondary battery is used as a power source.

FIG. 6 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

Examples 1-15 and Comparative Examples 1-3

1. Preparation of positive electrode plate: dissolving a positive electrode active material of ternary NCM811, a binder of polyvinylidene fluoride (PVDF), a conductive agent of acetylene black and a conductive agent of carbon nanotubes into N-methylpyrrolidone (NMP) in a mass ratio of 95.5:2:2:0.5, then fully stirring same until uniform to obtain a positive electrode slurry; and uniformly coating the positive electrode slurry onto a positive electrode current collector of aluminum foil, followed by drying, cold pressing and slitting, so as to obtain the positive electrode plate.

Figure 7:
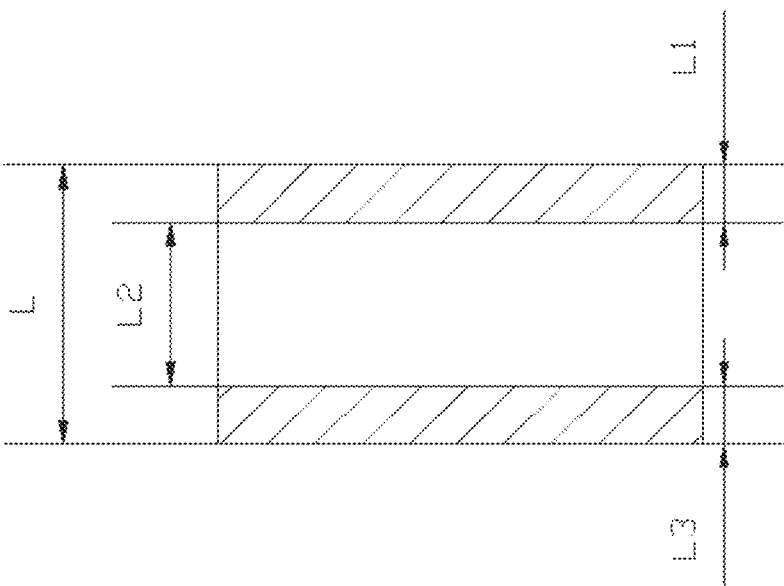
FIG. 7 is a schematic structural diagram of a negative electrode plate of Examples 1-15 of the present application.

2. Preparation of negative electrode plate:
   (1) Preparation of negative electrode slurry 1: dissolving a negative electrode active material of graphite, a conductive agent of acetylene black, a binder of styrene-butadiene rubber (SBR) and a thickening agent of sodium carboxymethyl cellulose (CMC-Na) into deionized water in a mass ratio of 95.5:2:1.5:1, then fully stirring same until uniform to obtain a negative electrode slurry 1;
   (2) Preparation of negative electrode slurry 2: dissolving a negative electrode active material of graphite, silicon suboxide, a conductive agent of acetylene black, a binder of styrene-butadiene rubber (SBR) and a thickening agent of sodium carboxymethyl cellulose (CMC-Na) into deionized water in a mass ratio of 95:0.5:2:1.5:1, then fully stirring same until uniform to obtain a negative electrode slurry 2;
   (3) Preparation of negative electrode slurry 3: dissolving a negative electrode active material of graphite, silicon suboxide, a solid electrolyte of LLZTO, a conductive agent of acetylene black, a binder of styrene-butadiene rubber (SBR) and a thickening agent of sodium carboxymethyl cellulose (CMC-Na) into deionized water in a mass ratio of 89.3:1:2:5:2:1.5:1, then fully stirring same until uniform to obtain a negative electrode slurry 3;
   (4) Preparation of negative electrode slurry 4: dissolving a negative electrode active material of graphite, silicon suboxide, a solid electrolyte of LLZTO, a conductive
agent of acetylene black, a binder of styrene-butadiene
rubber (SBR) and a thickening agent of sodium car-
boxymethyl cellulose (CMC-Na) into deionized water
in a mass ratio of 83.2:2.3:10:2:1.5:1, then fully stirring
same until uniform to obtain a negative electrode slurry
4;

(5) Preparation of negative electrode slurry 5: dissolving
a negative electrode active material of graphite, silicon
suboxide, a solid electrolyte of LLZTO, a conductive
agent of acetylene black, a binder of styrene-butadiene
rubber (SBR) and a thickening agent of sodium car-
boxymethyl cellulose (CMC-Na) into deionized water
in a mass ratio of 77:3.5:15:2:1.5:1, then fully stirring
same until uniform to obtain a negative electrode slurry
5;

(6) Preparation of negative electrode slurry 6: dissolving
a negative electrode active material of graphite, silicon
suboxide, a solid electrolyte of LLZTO, a conductive
agent of acetylene black, a binder of styrene-butadiene
rubber (SBR) and a thickening agent of sodium car-
boxymethyl cellulose (CMC-Na) into deionized water
in a mass ratio of 71:4.5:20:2:1.5:1, then fully stirring
same until uniform to obtain a negative electrode slurry
6;

(7) Preparation of negative electrode slurry 7: dissolving
a negative electrode active material of graphite, silicon
suboxide, a solid electrolyte of LLZTO, a conductive
agent of acetylene black, a binder of styrene-butadiene
rubber (SBR) and a thickening agent of sodium car-
boxymethyl cellulose (CMC-Na) into deionized water
in a mass ratio of 65:5.5:25:2:1.5:1, then fully stirring
same until uniform to obtain a negative electrode slurry
7;

dividing the negative electrode current collector of copper
foil into three coating film areas, and coating the
negative electrode slurry onto the copper foil of the
three coating film areas, followed by drying, cold-
pressing and slitting to obtain the negative electrode
plate. As shown in FIG. 7, the negative electrode film
layer of the negative electrode plate is correspondingly
divided into three parts, wherein the width of the first
film layer region is L1, the width of the second region
is L2, the width of the second film layer region is L3,
and the total width of the negative electrode film layer
is L, and the thicknesses of the first film layer region,
the second region and the second film layer region are
all 160 μm (after cold-pressing).

The different process parameters of examples 1-15 and
comparative examples 1-3 are shown in table 1.

TABLE 1

| | First film layer region | | | Second region | | | | Second film layer region | | |
|---|---|---|---|---|---|---|---|---|---|---|
| No. | Type of negative electrode slurry | $L_1/L$ | Coating surface density ($mg/cm^2$) | Type of negative electrode slurry | Mass content of solid electrolyte | $L_2/L$ | Coating surface density ($mg/cm^2$) | Type of negative electrode slurry | $L_3/L$ | Coating surface density ($mg/cm^2$) |
| Comparative example 1 | / | / | / | Negative electrode slurry 1 | 0% | 1 | 12 | / | / | / |
| Comparative example 2 | / | / | / | Negative electrode slurry 2 | 0% | 1 | 12 | / | / | / |
| Comparative example 3 | / | / | / | Negative electrode slurry 5 | 15% | 1 | 12 | / | / | / |
| Example 1 | Negative electrode slurry 2 | 0.3 | 12 | Negative electrode slurry 3 | 5% | 0.40 | 12 | Negative electrode slurry 2 | 0.3 | 12 |
| Example 2 | Negative electrode slurry 2 | 0.3 | 12 | Negative electrode slurry 4 | 10% | 0.40 | 12 | Negative electrode slurry 2 | 0.3 | 12 |
| Example 3 | Negative electrode slurry 2 | 0.3 | 12 | Negative electrode slurry 5 | 15% | 0.40 | 12 | Negative electrode slurry 2 | 0.3 | 12 |
| Example 4 | Negative electrode slurry 2 | 0.3 | 12 | Negative electrode slurry 6 | 20% | 0.40 | 12 | Negative electrode slurry 2 | 0.3 | 12 |
| Example 5 | Negative electrode slurry 2 | 0.3 | 12 | Negative electrode slurry 7 | 25% | 0.40 | 12 | Negative electrode slurry 2 | 0.3 | 12 |
| Example 6 | Negative electrode slurry 2 | 0.45 | 12 | Negative electrode slurry 5 | 15% | 0.1 | 14.2 | Negative electrode slurry 2 | 0.45 | 12 |
| Example 7 | Negative electrode slurry 2 | 0.4 | 12 | Negative electrode slurry 5 | 15% | 0.2 | 14.2 | Negative electrode slurry 2 | 0.4 | 12 |
| Example 8 | Negative electrode slurry 2 | 0.375 | 12 | Negative electrode slurry 5 | 15% | 0.25 | 14.2 | Negative electrode slurry 2 | 0.375 | 12 |
| Example 9 | Negative electrode slurry 2 | 0.20 | 12 | Negative electrode slurry 5 | 15% | 0.6 | 14.2 | Negative electrode slurry 2 | 0.20 | 12 |
| Example 10 | Negative electrode slurry 2 | 0.125 | 12 | Negative electrode slurry 5 | 15% | 0.75 | 14.2 | Negative electrode slurry 2 | 0.125 | 12 |

TABLE 1-continued

| | First film layer region | | | Second region | | | | Second film layer region | | |
|---|---|---|---|---|---|---|---|---|---|---|
| No. | Type of negative electrode slurry | $L_1/L$ | Coating surface density (mg/cm$^2$) | Type of negative electrode slurry | Mass content of solid electrolyte | $L_2/L$ | Coating surface density (mg/cm$^2$) | Type of negative electrode slurry | $L_3/L$ | Coating surface density (mg/cm$^2$) |
| Example 11 | Negative electrode slurry 2 | 0.20 | 12 | Negative electrode slurry 5 | 15% | 0.25 | 14.2 | Negative electrode slurry 2 | 0.55 | 12 |
| Example 12 | Negative electrode slurry 2 | 0.30 | 12 | Negative electrode slurry 5 | 15% | 0.25 | 14.2 | Negative electrode slurry 2 | 0.45 | 12 |
| Example 13 | Negative electrode slurry 2 | 0.45 | 12 | Negative electrode slurry 5 | 15% | 0.25 | 14.2 | Negative electrode slurry 2 | 0.3 | 12 |
| Example 14 | Negative electrode slurry 2 | 0.55 | 12 | Negative electrode slurry 5 | 15% | 0.25 | 14.2 | Negative electrode slurry 2 | 0.2 | 12 |
| Example 15 | Negative electrode slurry 1 | 0.375 | 12 | Negative electrode slurry 5 | 15% | 0.25 | 14.2 | Negative electrode slurry 1 | 0.375 | 12 |

3. Separator: a polypropylene film is used.

4. Preparation of electrolyte: ethylene carbonate (EC), ethyl methyl carbonate (EMC) and diethyl carbonate (DEC) are prepared into a solution in a volume ratio of 1:1:1, and LiPF$_6$ is uniformly dissolved into the above solution to obtain an electrolyte, wherein the concentration of LiPF$_6$ is 1.2 mol/L.

Production of Hard-Shell Battery

Using the negative electrode plate of examples 1-15 and comparative examples 1-3 as a negative electrode plate, the positive electrode plate made before as a positive electrode plate, and a polyethylene film with a thickness of 16 μm as an separator, respectively, winding and tab welding the negative electrode plate, the separator and the positive electrode plate and assembling same into a hard-shell battery, after injecting liquid (using the prepared electrolyte), charging same for the first time to produce spare hard-shell batteries 1-15, A-C, and the capacity of the battery cell is 7000 mAh.

Test of Battery

The cycling performance of the hard-shell batteries 1-15, A, B, and C is measured. In order to simulate the actual situation of the hard-shell battery in the module, steel plate clamps are used to clamp the two sides of the hard-shell battery for testing.

1) Repeatedly charging and discharging the battery until the capacity decays to 90%, recording the number of cycles of the battery, wherein the charging rate is 0.1 C, and the discharging rate is 0.5 C. It should be pointed out that the hard-shell battery can be used normally under these charging and discharging rates;

2) after the cycling of 1) is finished, the lithium precipitation of the battery is determined by disassembling the battery; and 3) fully charging the battery to an upper voltage limit of 4.25 V, storing at 60° C. for 100 days, and testing the storage capacity retention rate of the battery.

The above results are shown in Table 2.

TABLE 2

The results of the cycling test of the battery

| [Negative electrode plate] | Hard-shell battery | Number of cycles | Storage capacity retention rate/100 D | Lithium precipitation |
|---|---|---|---|---|
| Comparative example 1 | Hard-shell battery A | 262 | 93.5% | Severe lithium precipitation |
| Comparative example 2 | Hard-shell battery B | 168 | 92.9% | Severe lithium precipitation |
| Comparative example 3 | Hard-shell battery C | 373 | 89.4% | Slight lithium precipitation |
| Example 1 | Hard-shell battery 1 | 274 | 94.6% | Moderate lithium precipitation |
| Example 2 | Hard-shell battery 2 | 324 | 94.0% | Slight lithium precipitation |
| Example 3 | Hard-shell battery 3 | 429 | 93.2% | No lithium precipitation |
| Example 4 | Hard-shell battery 4 | 381 | 92.9% | No lithium precipitation |
| Example 5 | Hard-shell battery 5 | 365 | 92.4% | No lithium precipitation |
| Example 6 | Hard-shell battery 6 | 343 | 94.4% | Slight lithium precipitation |
| Example 7 | Hard-shell battery 7 | 364 | 94.0% | Slight lithium precipitation |
| Example 8 | Hard-shell battery 8 | 442 | 93.8% | No lithium precipitation |

TABLE 2-continued

| | | The results of the cycling test of the battery | | |
| [Negative electrode plate] | Hard-shell battery | Number of cycles | Storage capacity retention rate/100 D | Lithium precipitation |
| --- | --- | --- | --- | --- |
| Example 9 | Hard-shell battery 9 | 409 | 92.2% | No lithium precipitation |
| Example 10 | Hard-shell battery 10 | 400 | 91.5% | No lithium precipitation |
| Example 11 | Hard-shell battery 11 | 396 | 93.8% | Slight lithium precipitation |
| Example 12 | Hard-shell battery 12 | 438 | 93.7% | No lithium precipitation |
| Example 13 | Hard-shell battery 13 | 436 | 93.8% | No lithium precipitation |
| Example 14 | Hard-shell battery 14 | 392 | 93.8% | Slight lithium precipitation |
| Example 15 | Hard-shell battery 15 | 464 | 94.8% | No lithium precipitation |

It can be seen from Table 2 that
the results of examples 1-5 of the present application show that compared with comparative example 2, with the increase of the content of the solid electrolyte in the second region, the number of cycles of the battery increases significantly. When content of the solid electrolyte reaches 15% (example 3), the number of cycles of the battery reaches the highest value of 429. With the further increase of the content of the solid electrolyte, the number of cycles of the battery gradually decreases, but it is still better than that of comparative examples 1 and 2; compared with comparative example 3, the first film layer region and the second film layer region of the negative electrode plate of the present application do not contain solid electrolyte, and the storage capacity retention rate of the battery is significantly improved; the content of the solid electrolyte in the second region is not less than 15% (examples 3-5), and the battery does not precipitate lithium; in addition, with the gradual increase of the content of the solid electrolyte, the content of silicon suboxide also gradually increases to maintain the energy density of the battery.

The results of examples 6-10 of the present application show that compared with comparative example 2, as the width of the second region containing the solid electrolyte increases from 1/10 L to 1/4 L, the number of cycles of the battery gradually increases, and when the width is 1/4 L (example 8), the number of cycles of the battery reaches the highest value of 442, and then with the increase of the width, the number of cycles of the battery gradually decreases, but it is still higher than that of comparative examples 1-2; compared with comparative example 3, the storage capacity retention rate of the battery is significantly improved; the width of the second region is ≥1/4 L, and no lithium precipitation occurs in the battery.

Example 8 and 11-15 of the present application show that when the second region is located in the middle of the negative electrode plate in the width direction, the battery has the most number of cycles, the battery does not precipitate lithium, and the overall performance is the best; when pure graphite is used as the active material in the first film layer region and the second film layer region, the cycling and storage performance of the battery is further improved, and the lithium precipitation does not occur in the battery.

In summary, the negative electrode plate of the present application can significantly improve the cycling performance and storage performance of the battery. The content of the optional solid electrolyte in the negative electrode plate of the present application is not less than 15%, the width $L_2$ of the second region is ≥1/4 L, and lithium precipitation does not occur in the battery. When the width $L_2$ of the second region of the negative electrode plate of the present application is 1/4 L, the energy density is higher, and the comprehensive effect is the best.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A negative electrode plate, comprising a negative electrode current collector and a negative electrode film layer provided on at least one surface of the negative electrode current collector; wherein the negative electrode film layer comprises a first region and a second region along a width direction of the negative electrode film layer, the first region does not comprise a solid electrolyte, and the second region comprises a solid electrolyte, wherein both the first region and the second region comprise a negative electrode active material.

2. The negative electrode plate according to claim 1, wherein the first region comprises a first film layer region and a second film layer region along the width direction of the negative electrode film layer, and the second region is located between the first film layer region and the second film layer region; a width of the negative electrode film layer is denoted as L, a width of the first film layer region is denoted as $L_1$, a width of the second region is denoted as $L_2$, and a width of the second film layer region is denoted as $L_3$.

3. The negative electrode plate according to claim 2, wherein $0 < L_1/L \leq 0.75$.

4. The negative electrode plate according to claim 2, wherein $0 < L_3/L \leq 0.75$.

5. The negative electrode plate according to claim 2, wherein $0 < L_2/L \leq 0.75$.

6. The negative electrode plate according to claim 2, wherein $L_1=L_3$.

7. The negative electrode plate according to claim 2, wherein $L_1=L_2=L_3$.

8. The negative electrode plate according to claim 1, wherein a mass percentage of the solid electrolyte in the second region is greater than 0 and not greater than 30%.

9. The negative electrode plate according to claim 1, wherein the solid electrolyte comprises at least one selected from the group consisting of oxide solid electrolyte, sulfide solid electrolyte and polymer solid electrolyte.

10. The negative electrode plate according to claim 1, wherein the negative electrode active material in the first region and the second region each independently comprises at least one selected from the group consisting of artificial graphite, natural graphite, soft carbon, hard carbon, a silicon-based material, a tin-based material and lithium titanate.

11. The negative electrode plate according to claim 1, wherein the first region has a porosity of ≥24%.

12. The negative electrode plate according to claim 1, wherein the second region has a porosity of ≥20%.

13. A secondary battery, comprising the negative electrode plate according to claim 1.

14. A power consuming device, comprising the secondary battery according to claim 13.

15. A method for preparing a negative electrode plate, comprising the steps of:

dividing at least one surface of the negative electrode current collector into a first section and a second section along a width direction of the negative electrode current collector;

providing a first negative electrode slurry and a second negative electrode slurry, wherein the first negative electrode slurry does not comprise a solid electrolyte, and the second negative electrode slurry comprises a solid electrolyte; and coating the first section with the first negative electrode slurry, and coating the second section with the second negative electrode slurry, wherein both the first region and the second region comprise a negative electrode active material.

16. The method according to claim 15, further comprising: dividing the first section into a first portion and a second portion along the width direction of the negative electrode current collector, and the second section is located between the first portion and the second portion.

17. The method according to claim 15, wherein a ratio of a width of the first portion to a width of the negative electrode current collector is greater than 0 and not greater than 0.75.

18. The method according to claim 15, wherein a ratio of a width of the second portion to a width of the negative electrode current collector is greater than 0 and not greater than 0.75, and/or wherein a ratio of a width of the second section to a width of the negative electrode current collector is greater than 0 and not greater than 0.75.

19. The method according to claim 15, wherein a width of the first portion is equal to that of the second portion.

20. The method according to claim 15, wherein a mass content of the solid electrolyte in the second negative electrode slurry is greater than 0 and not greater than 30%.

\* \* \* \* \*